(No Model.)
G. W. THORP.
CLAMP FOR HOLDING PLOWSHARES.
No. 359,109. Patented Mar. 8, 1887.
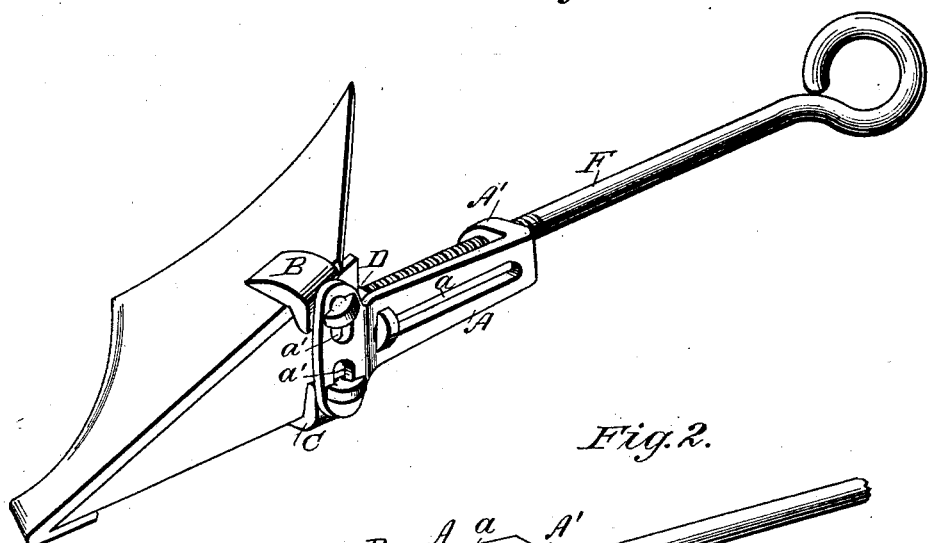
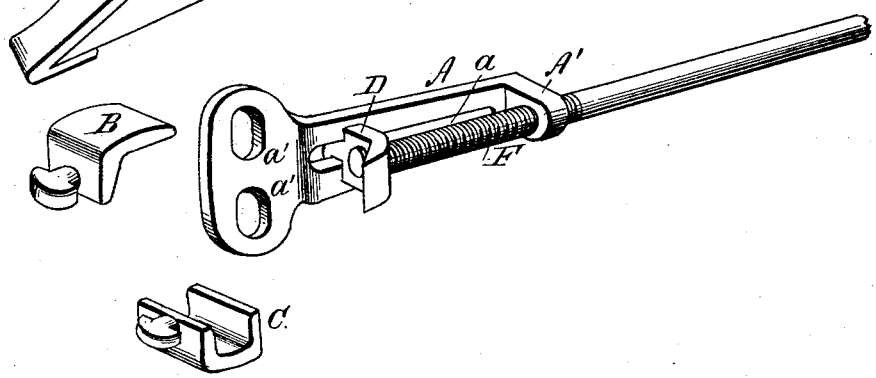

UNITED STATES PATENT OFFICE.

GEORGE W. THORP, OF CONWAY SPRINGS, KANSAS.

CLAMP FOR HOLDING PLOWSHARES.

SPECIFICATION forming part of Letters Patent No. 359,109, dated March 8, 1887.

Application filed December 29, 1886. Serial No. 222,923. (No model.)

*To all whom it may concern:*

Be it known that I, GEORGE W. THORP, of Conway Springs, in the county of Sumner and State of Kansas, have invented certain new and useful Improvements in Clamps for Holding Plowshares while being Welded or Sharpened, of which the following is a specification, reference being had to the accompanying drawings, forming part thereof, in which—

Figure 1 is a perspective view of my clamp in operation. Fig. 2 is a detail perspective view of the clamp.

The object of my invention is to provide a clamp for holding the two wings of a plowshare securely together during the process of welding or sharpening, so that when the wings are placed in proper relative position for welding the clamp will prevent any slipping.

The invention will be first described, and then specifically pointed out in the claims.

Forged plowshares are made of two pieces of metal welded together into the form shown in the drawings, the landside-wing being at approximately a right angle to the mold-board wing, and the forward end of the mold-board wing is bent under to receive the pointed end of the triangular landside-wing. It is when in this position that it is necessary to bind the two wings of the plowshare together, so that they will not get displaced while the blacksmith is welding them together.

A represents the main plate formed with the longitudinal slot *a*, and with the two transverse slots *a' a'* at its outer end, the inner end of the plate being provided with a lug, A', having a screw-threaded aperture.

F is the operating-rod having screw-threads and passing through the threaded aperture in the lug A', and is swiveled in a longitudinally-traveling jaw, D, having a T-headed stem extending through the slot *a* in the main plate. In the slots *a'* are pivoted the jaws B C, which face each other and are at right angles to the jaw D.

The jaws B C are provided with T-headed stems, which form the pivots, the heads being at right angles to or crossing the slots *a'* when the jaws are in operative position, and the jaws may be readily removed when desired by turning them so as to bring the heads of their stems into alignment with the slots. The jaw B has its holding-flange inclined slightly inward, so as to firmly engage the mold-board wing at its point of juncture with the landside-wing and hold it from slipping, and the jaw C is made U shape to receive the lower edge of the landside-wing, so that the two wings will be firmly held together when the screw is operated to force the jaw A' forward, as will be readily understood.

The jaws B C could be formed integral with the plate; but I prefer to form them as described, as they are allowed a pivotal as well as a sliding movement to adapt themselves to the plowshare as it is forced between them by the traveling jaw, and then the jaws may be readily replaced if broken.

It is obvious that the clamp could be furnished with jaws of different sizes to suit different widths of landside wings.

Having thus described my invention, what I claim as new, and desire to secure by Letters Patent, is—

1. In a clamp for holding plowshares, the combination of the main plate having two jaws facing each other on its forward end, and the longitudinal operating-screw passed through a threaded lug on the rear end of the plate, substantially as set forth.

2. The combination, with the main plate having two jaws facing each other at the forward end, and a lug at its opposite end having a threaded aperture, of the screw-rod passed through said apertured lug, and having a forwardly-facing jaw swiveled on its forward end approximately at right angles to the other two jaws, substantially as set forth.

3. The combination, with the longitudinally-slotted main plate having jaws facing each other at opposite sides of its forward end, and a lug at its opposite end, having a threaded aperture, of the traveling jaw having a headed stem sliding in said longitudinal slot, and the screw-rod passed through the aperture in the lug and swiveled in the traveling jaw, substantially as set forth.

4. The combination, with the main plate having transverse slots in its front end, a longitudinal slot, and a lug at the rear end of the plate, having a threaded aperture, of the two jaws at the forward end of the plate, having headed stems sliding in the transverse slots, a traveling head having a headed stem sliding in the longitudinal slot and at right angles to the forward jaws, and the screw-rod engaging the threaded aperture in the lug and swiveled at its front end to the traveling jaw, substantially as set forth.

5. The combination, with the longitudinally-slotted main plate having the movable opposite facing jaws at its forward end, the flange of one jaw being inclined inward on its engaging surface and the other jaw being U shape, and the lug at the rear end of the plate, having a threaded aperture, of the traveling jaw having a stem entering said longitudinal recess, and the screw-rod passing through the lug and swiveled to the traveling jaw, substantially as set forth.

GEORGE W. THORP.

Witnesses:
E. E. BAIRD,
J. E. HARE.